United States Patent
Zhang et al.

(10) Patent No.: US 12,229,719 B1
(45) Date of Patent: *Feb. 18, 2025

(54) COVERAGE MAP FOR ASSET TRACKING

(71) Applicant: Samsara Inc., San Francisco, CA (US)

(72) Inventors: Jennifer Zhang, San Francisco, CA (US); Joanne Wang, Los Gatos, CA (US); Wei Wu, San Francisco, CA (US); Henry Qin, San Francisco, CA (US); Jordan Gilbertson, Seattle, WA (US); Hao Miao Yu, San Francisco, CA (US); Grant Kalasky, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,399

(22) Filed: Nov. 22, 2023

Related U.S. Application Data (63) Continuation of application No. 17/930,329, filed on Sep. 7, 2022.

(60) Provisional application No. 63/358,605, filed on Jul. 6, 2022.

(51) Int. Cl.
*G06Q 10/087* (2023.01)

(52) U.S. Cl.
CPC ................... *G06Q 10/087* (2013.01)

(58) Field of Classification Search
CPC ........ G06Q 10/20; G06Q 50/40; G06Q 10/06; G06Q 2220/00; G06Q 10/08; G06Q 10/0833; G06Q 10/06315; G06Q 10/0631; G06Q 10/087; G08G 1/123; G08G 1/13; G07C 5/008; G01C 21/3691; G01C 21/3461; G01C 21/3682; G01C 21/34; G01C 21/362
See application file for complete search history.

(56) References Cited

U.S. PATENT DOCUMENTS

| | | | | |
|---|---|---|---|---|
| 6,339,745 | B1 * | 1/2002 | Novik | G08G 1/123 |
| | | | | 701/484 |
| 6,892,131 | B2 * | 5/2005 | Coffee | B28C 5/422 |
| | | | | 455/518 |
| 8,275,508 | B1 * | 9/2012 | Adams | G07C 5/008 |
| | | | | 715/810 |
| 10,309,788 | B2 * | 6/2019 | Davidson | G01C 21/3852 |
| 10,852,152 | B2 * | 12/2020 | Mitchell | G06Q 10/00 |
| 2008/0121690 | A1 * | 5/2008 | Carani | G01S 5/0294 |
| | | | | 235/376 |
| 2013/0073323 | A1 * | 3/2013 | Zacharia | G06Q 10/025 |
| | | | | 705/5 |

(Continued)

OTHER PUBLICATIONS

Keeley, Joe; "How to Create Shared Collaborative Google Maps", Aug. 13, 2021; 8 pages.

*Primary Examiner* — Florian M Zeender
*Assistant Examiner* — Vanessa Deligi (57) ABSTRACT

The technology disclosed herein enables configuration and sharing of a coverage map which displays asset data. In various implementations, an asset owner provides access to select portions of asset data, such as vehicle performance data, to an end-user. The asset owner configures a coverage map to display the selected data according to the type of asset data to be displayed, the scope of the data to be displayed, and other map attributes. Once configured, a URL is generated which the fleet operator provides to the end-user.

20 Claims, 9 Drawing Sheets

(56) References Cited

U.S. PATENT DOCUMENTS

| | | | |
|---|---|---|---|
| 2013/0104035 A1* | 4/2013 | Wagner | G06F 16/29 |
| | | | 715/240 |
| 2017/0010763 A1* | 1/2017 | Mitchell | G01C 21/3682 |
| 2017/0230790 A1* | 8/2017 | Skomra | G07C 5/008 |
| 2018/0194575 A1* | 7/2018 | Anderson | B65G 67/04 |
| 2019/0113345 A1* | 4/2019 | Stewart | G06F 3/0483 |
| 2022/0345859 A1* | 10/2022 | Falla Cepeda | H04W 4/40 |

* cited by examiner

COVERAGE MAP FOR ASSET TRACKING

CROSS REFERENCE TO RELATED APPLICATION

This application claims priority to and benefit from U.S. Provisional Patent Application No. 63/358,605 titled "Coverage Map For Asset Tracking" filed on Jul. 6, 2022, and U.S. patent application Ser. No. 17/930,329 titled "Coverage Map For Asset Tracking" filed Sep. 7, 2022, which are expressly incorporated by reference herein.

TECHNICAL FIELD

Aspects of the disclosure are related to the field of computing and data management technology and, in particular, to asset tracking and data visualization technology.

BACKGROUND

The ability to track assets and to acquire and visualize performance and operations data of assets in real-time and near real-time provide fleet operators with valuable granular insights into fleet operations. In a fleet of vehicles, for example, gateway devices onboard the vehicles transmit real-time vehicle performance and operations data to an asset datastore accessible by the fleet owner or other stakeholder. In a basic use of the technology, asset gateway devices transmit time-stamped location data of an asset such as vehicle so its location can be tracked.

Coupled to an onboard computer, however, gateway devices can transmit a wide variety of metrics, such as engine performance and diagnostic data, as well as data reflecting vehicle operations, such as when a driver lowers a lift to unload cargo. With the substantial volume of fleet asset data that is available to fleet operators, data management often falls to asset data management services. Asset data management services manage data collection from the gateway devices, but also provide detailed analysis of the data for the fleet operator to extract the most value from the data, such as by using the data to identify and cut excessive costs or to eliminate redundancies. So, too, can various aspects of the asset data be of value to other fleet stakeholders, such as fleet owners, lessees, insurers, and others.

Overview

Technology is disclosed herein that includes methods, systems, and software for providing a coverage map for fleet assets through which an organization can provide access to select portions of asset data. In various implementations, a method of sharing a map comprises receiving configuration information for a coverage map from the organization operating a fleet of assets and receiving asset data produced by asset gateway devices associated with the fleet of assets. Upon receiving a request for a coverage map from an end-user's device, the method further comprises generating an instance of the coverage map according to the configuration information and sending the instance of the coverage map to the device of the end-user.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several implementations are described in connection with these drawings, the disclosure is not limited to the implementations disclosed herein. On the contrary, the intent is to cover all alternatives, modifications, and equivalents.

DETAILED DESCRIPTION

Technology is disclosed herein by which an organization operating a fleet of assets can provision a portion of the asset data of its assets and configure that portion for consumption by a third-party. In an implementation, an asset data service receives asset data from a fleet of assets operated by an organization. The asset data service receives the asset data via asset gateway devices which are associated with the fleet of assets and which transmit the asset data to the asset data service. In an implementation, the assets operated by the organization comprise vehicles, and the asset data comprises vehicle performance data.

The asset data service receives configuration information for a coverage map based on the asset data from the organization operating the assets. The configuration information can comprise a subset of the asset data, as well as a scope of the data. The scope of the data can include the geographic location associated with the asset data, a time associated with the asset data, or the type of asset associated with the asset data. In an implementation, the type of coverage map which displays the asset data is determined by the type of asset data displayed.

To receive the configuration information for the coverage map, the asset data service displays to the organization a user interface comprising configuration panels. The asset data service receives from the organization selections of configuration options from the configuration panels. The asset data service creates a URL corresponding to the coverage map as it has been configured by the organization. In an implementation, the configuration options include one or more types of asset data as well as the scope of the data to be displayed in the coverage map. The organization can also select configuration options which include display attributes for displaying the asset data.

Figure 1:
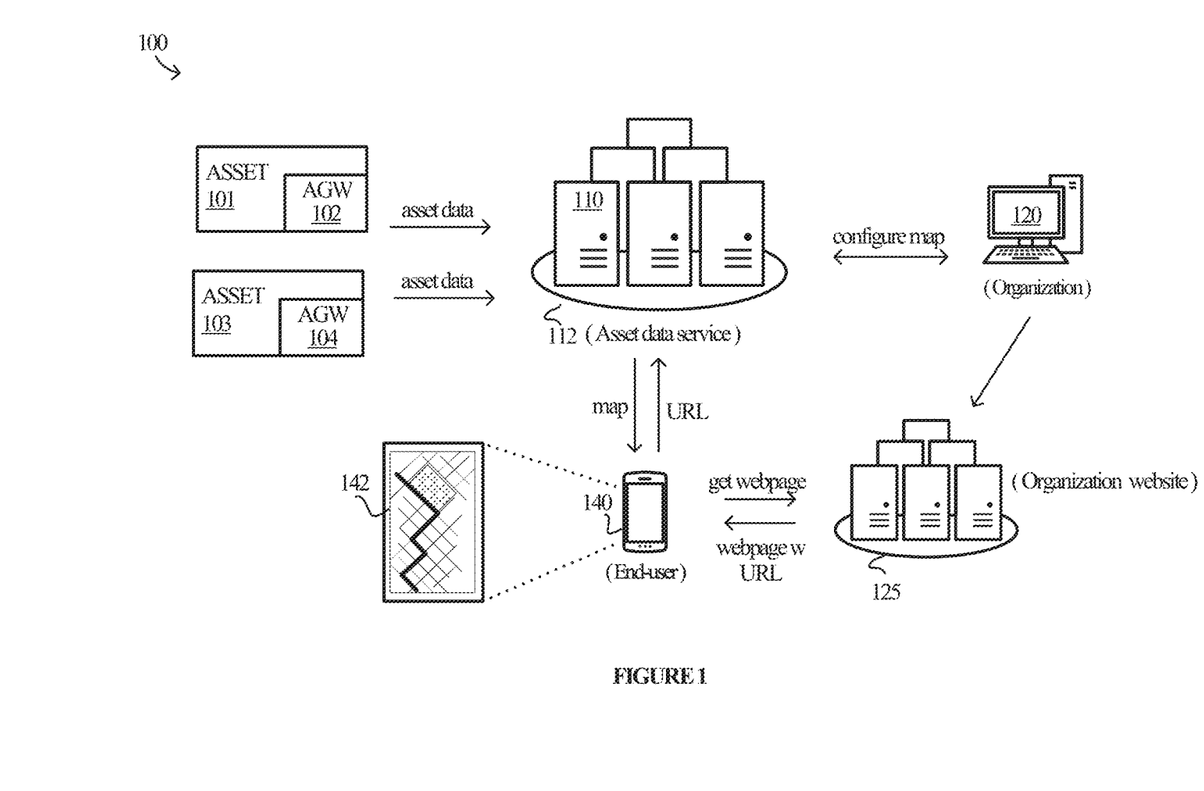
FIG. 1 illustrates an operational environment in an implementation.

Turning now to the figures, FIG. 1 illustrates operational environment 100 in an implementation that confers some or all the technical effects and other benefits discussed above. Operational environment 100 includes assets 101 and 103, asset data service 112, computing device 120, hosting service 125, and end-user device 140. Assets 101 and 103 include asset gateways 102 and 104 respectively.

Figure 9:
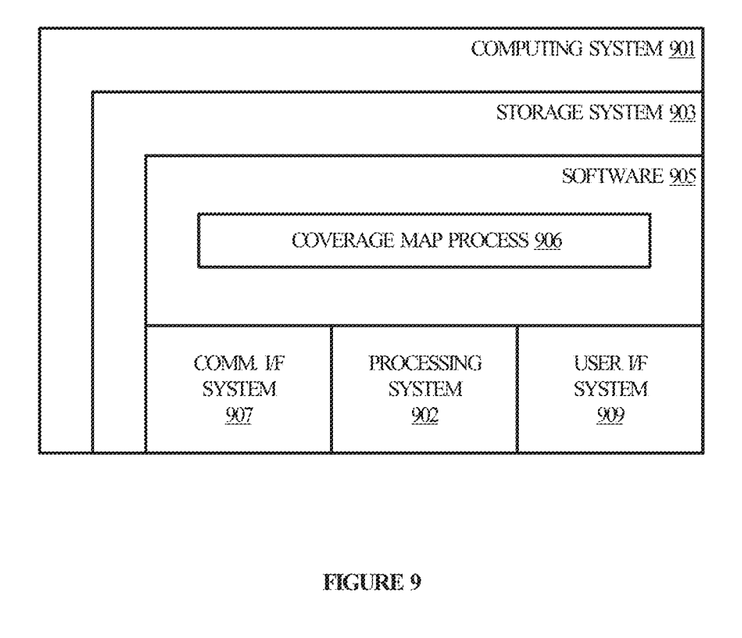
FIG. 9 illustrates a computing system suitable for implementing the various operational environments, architectures, processes, scenarios, and sequences discussed below with respect to the other Figures.

Asset data service 112 is implemented on one or more server computers 110, of which computing device 900 in FIG. 9 is representative, and usually in the context of one or more data centers that include other equipment such as switches, routers, and storage devices that function together to provide asset data service 112. Asset data service 112 may be hosted "in the cloud," whether it be an on-premises cloud, a third-party cloud, or a hybrid cloud distributed between on-prem and off-prem clouds.

Asset 101 and asset 103 are each representative of any assets capable of generating asset data and providing the data to an asset gateway. Example assets include automotive assets (cars, trucks, vehicles, etc.), shipping assets (railcars, container ships, etc.), airborne assets, construction and/or industrial assets, agricultural assets, and the like. Asset gateway 102 and asset gateway 104 are each an asset gateway device capable of reading asset data provided by assets 101 and 103 respectively and communicating the data to asset data service 112. Each gateway device may be a third-party device or an OEM device that records asset data such as vehicle diagnostic and operations data, including global positioning system (GPS) location data, engine diagnostics, fuel efficiency data, image data, video data, vehicle analytics data, operator data, workflow data, and the like.

Asset data service 112 is representative of one or more services capable of receiving asset data from asset gateway devices (e.g., asset gateways 102 and 104) and presenting the data to downstream computing devices, potentially associated with customer organizations such as a fleet operator, insurance company, and the like. Computing device 120 is representative of one such computer associated with an organization and in communication with asset data service 112 for purposes of obtaining and presenting asset data to personnel.

Personnel associated with an organization may utilize computing device 120 to configure a coverage map that is ultimately consumable by stakeholders via their own computing devices. For example, computing device 120 may be used to configure a coverage map displayed by end-user device 140 in an implementation. Computing device 120 communicates with asset data service 112 to configure the map, but also communicates with hosting service 125 to which a link to the coverage map is published. The organization may be, for example, an asset data consumer associated with assets 101 and 103, such as a fleet vehicle owner, operator, or insurer, to which the full complement of asset data is available via asset data service 112. Computing devices associated with organization (of which computing device 120 is representative) receive and handle asset data associated with assets from asset data service 112.

Asset data service 112 displays a configuration user interface on a computing device of the organization by which the organization can configure coverage maps for displaying select portions of the asset data. A user of end-user device 140 may thus obtain the map by navigating to a website on hosting service 125 and clicking on or otherwise selecting the link, which directs end-user device 140 to obtain an instance of the coverage map from asset data service 112 and/or hosting service 125. For example, asset data service 112 may provide the entire coverage map to end-user device 140. Alternatively, hosting service 125 may obtain asset data from asset data service 112 with which to populate the map. In still other implementations, other parties may be involved in provisioning all or portions of the coverage map. In any case, asset data service 112 governs which data is included in the coverage map which itself is governed by configuration parameters provided by organization personnel via computing device 120.

Figure 2:
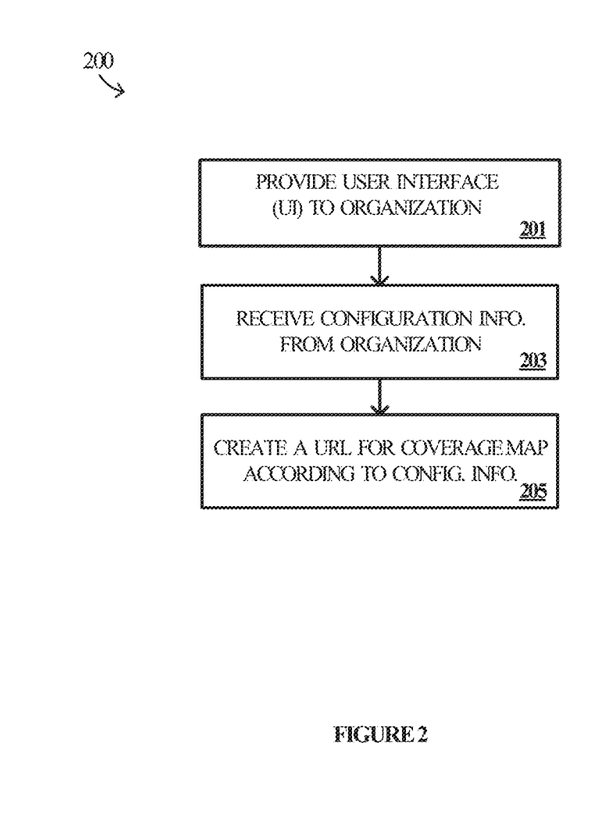
FIG. 2 illustrates a process by which a coverage map is configured in an implementation.

In order to provide a coverage map discussed above, asset data service 112 employs process 200, illustrated in FIG. 2. Process 200 may be implemented in program instructions in the context of any of the software applications, modules, components, or other such elements of asset data service 112. The program instructions direct a suitable computing device (or devices) that provide(s) asset data service 112 to operate as follows, referring parenthetically to the steps of FIG. 2 and to a server computer in the singular for purposes of clarity.

To begin, a server computer executing process 200 provides a user interface comprising one or more configuration panels for configuring a coverage map (step 201). The user interface may be provided to a suitable client computing device via which personnel associated with an organization configure parameters of the coverage map. In an example, the server computer serves the user interface to the client computer and the client computer displays the user interface to an end-user, allowing the end-user to supply user input.

The configuration panels comprise options for configuring a coverage map for an end-user device, which can include selecting the type of asset data to be displayed and the scope of the asset data to be displayed. Configuration options can also include attributes of the coverage map relating to how it is displayed on an end-user's device. The client device receives user input and passes it to the server computer. The server computer, employing process 200, receives the user input, which comprises selections of options for configuring the coverage map (step 203). These options can include the type of asset data or derivative of the asset data to be displayed on the coverage map, the scope of the data to be displayed, such as a timeframe during which the asset data was collected or geographic area where the asset data was collected, and other attributes for configuring the map, including options available to the end-user to modify the display.

Next, upon receiving an indication by the user that the configuration selections are complete, the server computer creates a link such as a uniform resource locator (URL) by which an end-user obtains an instance of the configured coverage map (step 205). The URL may be used to look-up configuration information, or it may be encoded with the configuration information—or a combination of both. The server computer provides the link to the client computer (or some other computer), which ultimately publishes via a website or other such environment. End-users may thus navigate to the link to obtain an instance of the coverage map, which is provided in accordance with process 300 illustrated in FIG. 3.

Process 300 may also be implemented in program instructions in the context of any of the software applications, modules, components, or other such elements of asset data service 112. The program instructions direct a suitable computing device (or devices) that provide(s) asset data service 112 to operate as follows, referring parenthetically to the steps of FIG. 3 and to a server computer in the singular for purposes of clarity.

Figure 3:
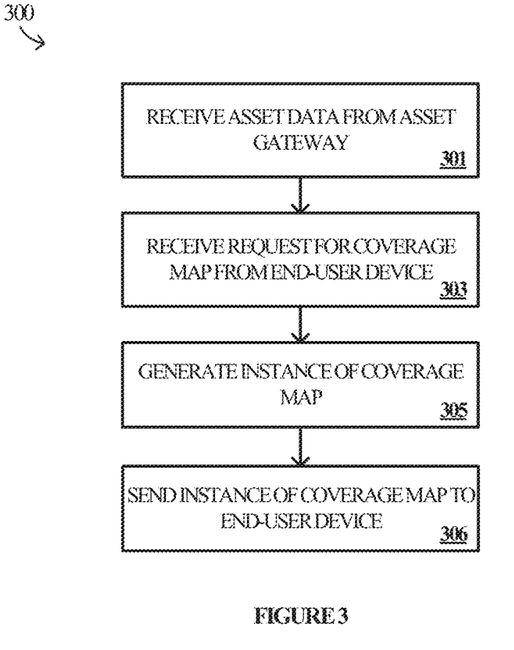
FIG. 3 illustrates a process by which a coverage map is shared in an implementation.

In operation, a server computer employing process 300 receives asset data from asset gateways coupled with assets (step 301). The data may be communicated in the form of logs or other suitable messages from the asset gateway devices. The gateways may communicate the data continuously, on-demand, periodically, or at some other interval. The server computer stores the asset data in association with one or more of a relevant asset, gateway, organization, or the like, such that the data can be retrieved and processed for real-time or near real-time presentation and analysis.

Next, the server computer receives a request for a coverage map (step 303). The request may occur as the result of a user navigating to a URL configured and provisioned as discussed above with respect to FIG. 2. For example, the request may be made by the end-user by clicking or tapping a hyperlink for the URL on the end-user's device. In response to the request, the server computer generates an instance of the coverage map (or an instance of data with which to populate the coverage map) based on configuration information specified by the organization associated with the relevant gateway(s) (step 305). The server computer renders the coverage map to display a portion of the asset data specified in the configuration information according to a geographical location of the data and/or according to a timeframe.

In an implementation, the server computer generates an instance of the coverage map by transmitting the selected asset data and other map parameters via an application programming interface (API) to a mapping service. The mapping service generates the coverage map according to the configuration information and transmits the map to the server computer which then supplies it to the end-user. The mapping service may be external to the entity operating the asset data service or housed within the entity's internal network.

The server computer ultimately transmits the instance of the coverage map to the computing device of the end-user for display (step 307). Alternatively, the rendering and/or serving of the map may be delegated to a downstream element such as web server or end-user device. The extent to which an end-user can modify the display of the coverage map may be specified in the configuration information provided by the organization configuring the coverage map. For example, the organization may specify which map attributes are available for the end-user to adjust and the extent of the adjustment.

Figure 4:
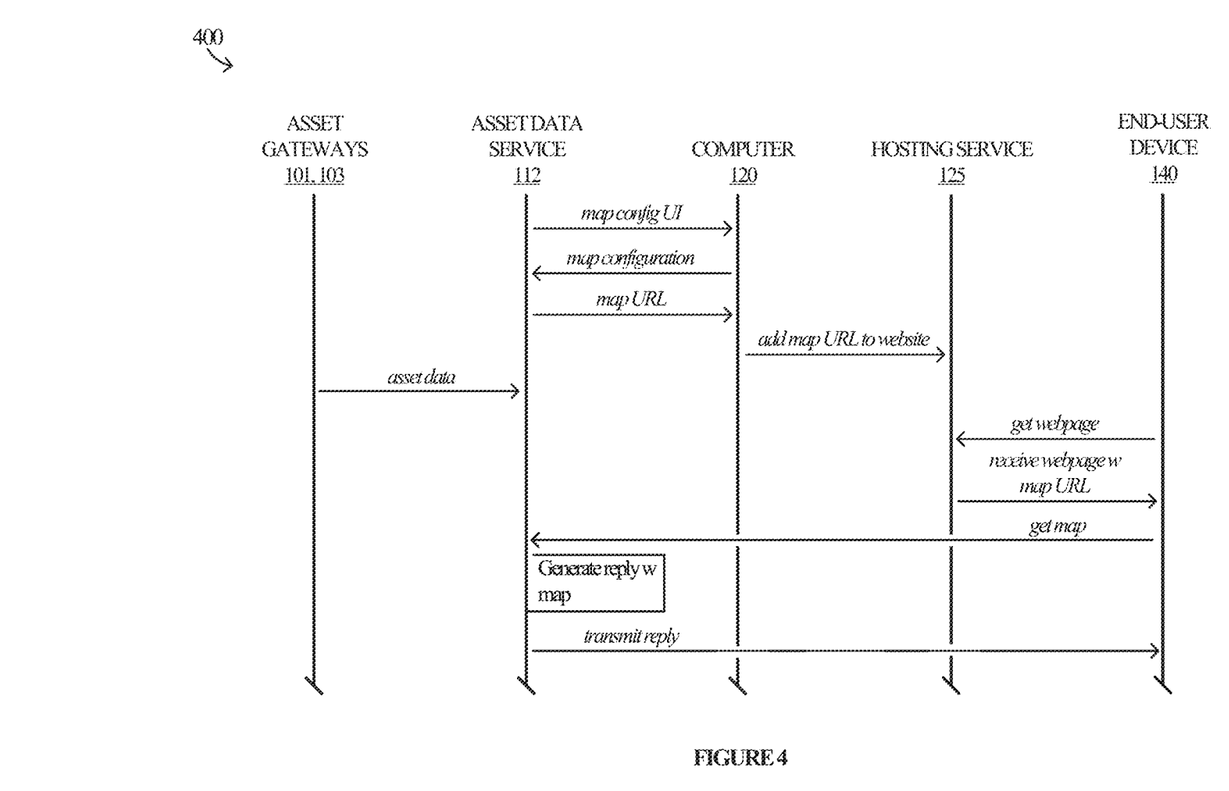
FIG. 4 illustrates an operational scenario in which a coverage map is configured and shared with an end-user device in an implementation.

FIG. 4 illustrates an operational scenario 400 in an application of process 200 and process 300 with respect to the elements of operational environment 100. In operation, asset data service 112 receives, stores, and manages asset data from assets 101 and 103 via asset gateways 102 and 104 respectively. Asset data service 112 also comprises map configuration and map sharing processes of which processes 200 and 300 are representative. Organization personnel operating computing device 120 configure select portions of asset data stored by asset data service 112 for viewing in coverage map for a third party via end-user device 140. The organization configures the coverage map according to the data it wishes to reveal to the third party and according to the specific needs or interests of the third party. Alternatively, the organization may wish to configure a coverage map of specific asset data for its own internal use. To create and configure a coverage map, asset data service 112 provides a configuration user interface (UI) for display by computing device 120. The user interface may include options available to the organization for creating and configuring coverage map 142.

The options for configuring a coverage map include the type of asset data to display on the coverage map, such as a type of vehicle producing the asset data, such as garbage trucks but not recycling haulers, for example. The type of asset data also comprises operational events (e.g., vehicle stops lasting longer than 30 seconds), routes (e.g., routes traveled by recycling haulers over a preceding 8-hour period), or areas (e.g., farmland traversed by harvesting equipment). Asset data may be categorized and selected according to specific vehicles, to specific locations, or to specific routes (such as recurring delivery routes). Options also include displaying derivatives of the asset data, such as the average fuel economy of a vehicle for a particular route. Derivative data can also include metrics aggregated across a fleet or a subset of a fleet.

In an implementation, asset data service 112 determines the type or format of the data display according to the type of data to be displayed. For example, events data or data associated with discrete locations or times may be represented by points on coverage map 142, while route data generated according to time-stamped GPS data by represented by lines or line segments on coverage map 142. Similarly, coverage map 142 may comprise a heat map to illustrate intensity, such as by shading areas according to the density of vehicles or proliferation of vehicle stops in an area over a particular time period. If, for example, a fleet owner wishes to identify areas in a city where average vehicle speed is below a threshold amount, the fleet owner can configure a coverage map to display the derived metric of average vehicle speed that is shaded according to ranges of speeds.

Organization personnel, via computing device 120, can configure the coverage map to reveal data associated with an entire fleet, a subset of the fleet, or a single vehicle. Configuration options also include defining a scope of the asset data by a geographic area where it was recorded or by a timeframe (e.g., preceding 24 hours or a particular day). Configuration options also include adding a legend to the coverage map, such as displaying a route traveled by an asset that is color-coded according to recency in time. Configuration options can include specifying the base map upon which the asset data is displayed, such as a satellite image map, a terrain map, or a street map. Configuration options also include tags or tagged events, that is, events or locations tagged by a driver, operator, or identified by analysis of the asset data. Configuration options also include displaying asset data with the time at which the data was recorded. Configuration options also include selections for map attributes which can be modified on end-user device 140 (e.g., zoom) or for map attributes which are to be fixed.

Upon completing a configuration for a coverage map, organization personnel via computing device 120 prompt asset data service 112 to generate a URL for the configured coverage map. The organization personnel, via computing device 120, provide the URL to a third party for whom the coverage map is configured, such as by providing the URL in a hyperlink on a website. In an implementation, the configuration information for coverage map 142 is stored in a link datastore which stores addresses for specific map configurations for reuse. Alternatively, the configuration information may be encoded within the URL.

For example, specific configurations may be stored according to the organization (e.g. fleet owner) and presented to the organization during the process of configuring the map. New configurations may be developed by tweaking stored configurations. In an implementation, asset data service 112 displays in the configuration user interface the configuration options with an indication of recommended options to simplify the configuration process. Alternatively, asset data service 112 provides a default coverage map configuration which the organization can modify as needed.

Figure 5:
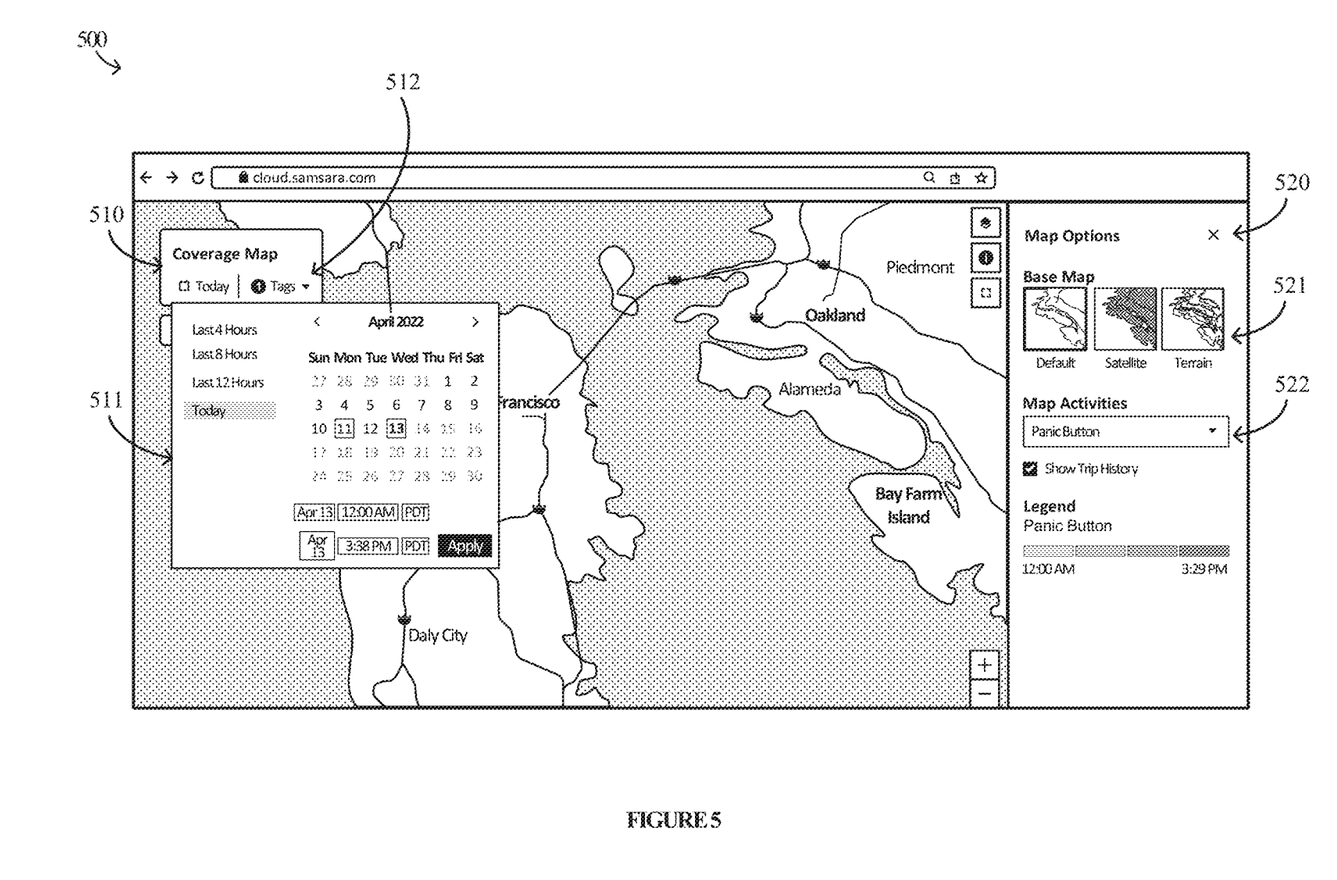
FIG. 5 illustrates an implementation of a configuration user interface.

FIG. 5 illustrates a user interface 500 provided by an asset data service for configuring a coverage map in an implementation. User interface 500 includes configuration panes 510 and 520 comprising options by which a user associated with the asset data can configure a coverage map for sharing with an end-user. Configuration pane 510 presents the user with option 511 to filter the asset data according to a particular timeframe, such as by hours or days. Option 512 can be used to select tags for display on the coverage map. For example, tags can be associated with specific vehicles or specific drivers. On configuration pane 520, the user can select the base map layer 521 on which the selected asset data will be displayed. The user can also select the types of activities 522 to be displayed. Activities 522 can include discrete events such as when the driver opens the back door to the vehicle or when the stop sign paddle on a school bus swings out. Also on configuration pane 520 is the option to display a trip history for a selected vehicle, which may be displayed as a line tracing the route of the vehicle on the map for the selected time period. Other data may augment the display, such as event data showing vehicle stops. Also displayed with activities 522 is a color-coded legend which indicates the time or timeframe when events occurred or when the data was recorded.

Figure 6:
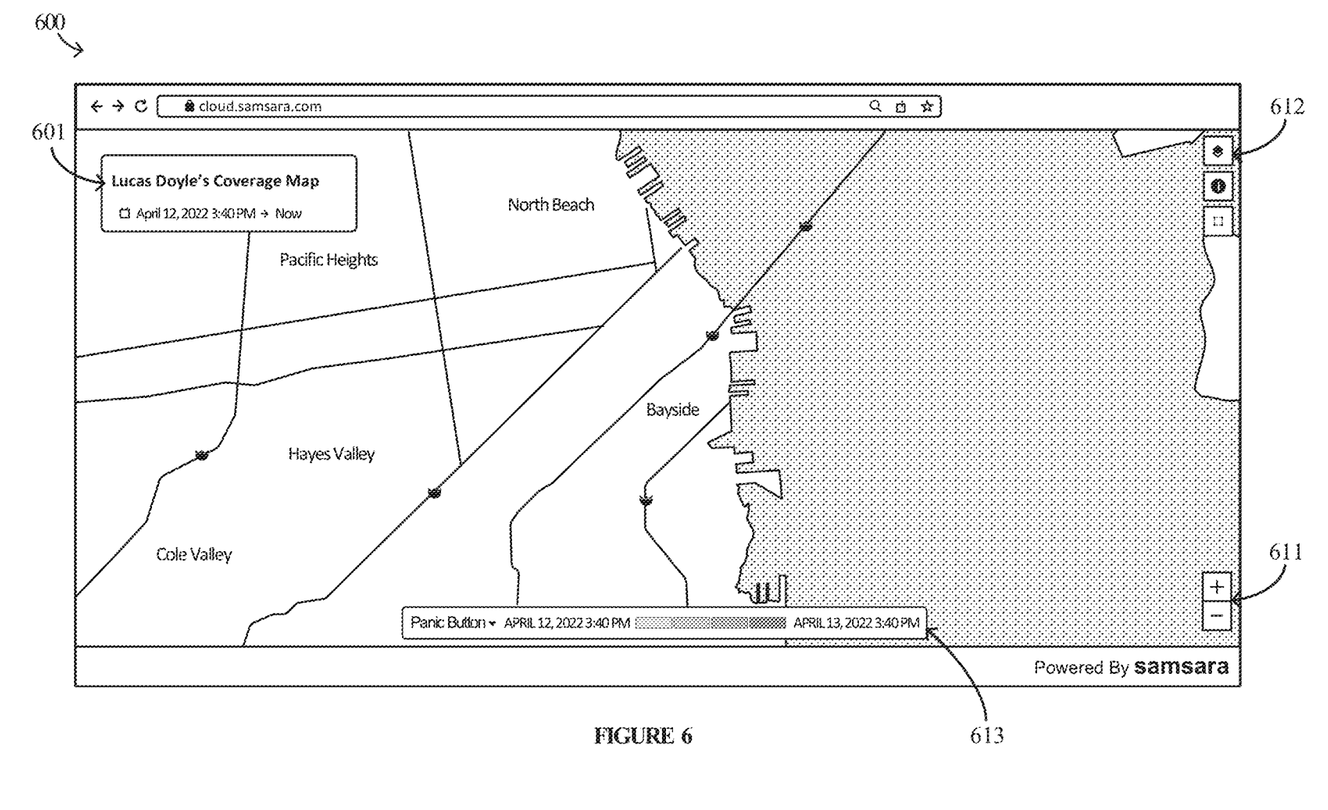
FIG. 6 illustrates an implementation of a coverage map.

FIG. 6 illustrates a coverage map 600 generated by an asset data service in an implementation. Coverage map 600 is representative of a coverage map that may be configured and generated by an exemplary asset data service and displayed on an end-user device as discussed above. Coverage map 600 is obtained by a computing device which requests a URL associated with the map into an Internet browser. Coverage map 600 is configured for the end-user by an entity which owns or is associated with the asset data that is displayed. In this example, the location of a vehicle is indicated by a line superimposed on a road map layer. Coverage map 600 includes a label 601 indicating the timeframe of the displayed asset data. Coverage map 600 displays options for modifying the map view, such as by zooming in or out (611) or changing the map base layer (612). Coverage map 600 also displays map legend 613 which indicates the time or timeframe at which the displayed data (i.e., location) was recorded.

Figure 7:
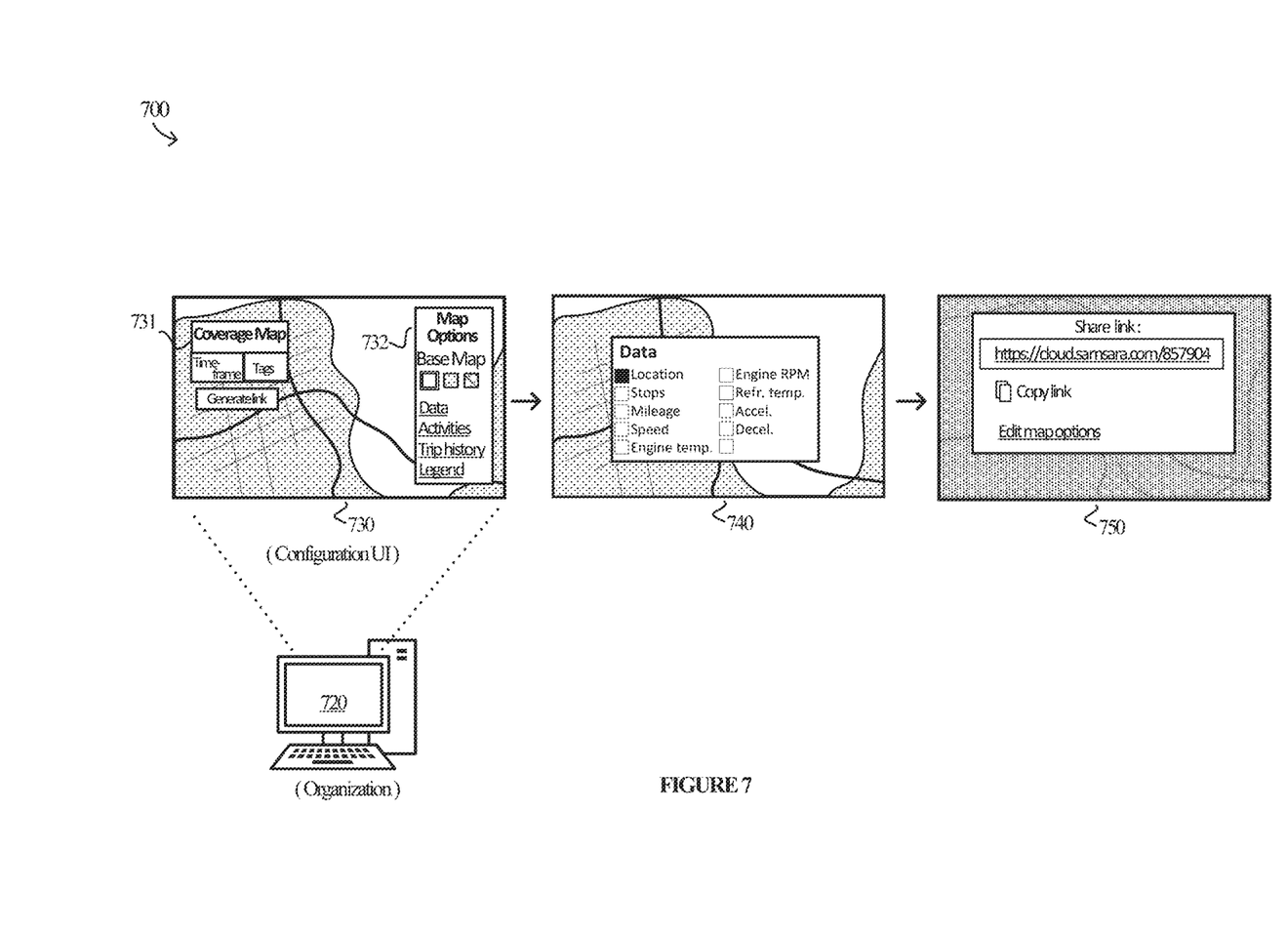
FIG. 7 illustrates a process of configuring a coverage map in an implementation.

FIG. 7 illustrates a process of configuring a coverage map in an implementation. An asset data service displays a configuration UI on computing device 720 of an organization associated with the asset data. In view 730, the configuration UI displays multiple configuration panes comprising options for configurating the coverage map. In pane 731, a user can configure the scope of the displayed data according to a timeframe for a time at which the data was recorded. The user can also select data associated with one or more tags, such as tags associated with particular assets or asset operators. In pane 732, the user can select options such as the coverage map base layer (e.g., street map, satellite map, or terrain map), as well as particular types of asset data and a trip history. In an implementation, configuration UI 730 displays recommended configuration options, such as display options based on the type of data to be displayed, or a default set of configuration options to facilitate a configuration for a user who frequently generates the same type of coverage map for various end-users.

In view 740, the user has the option to select the type(s) of asset data to be displayed on the coverage map. Asset data includes location data (e.g., time-stamped GPS data) as well as performance metrics acquired by an asset gateway operatively coupled to a vehicle or, more specifically, to a vehicle's onboard computer, such as vehicle diagnostic data, engine diagnostic data, vehicle operation and performance data, and driver or operator activity. Asset data is time-stamped and transmitted via the asset gateway to the asset data service which stores and manages the data.

After configuration is complete, the user prompts the asset data service to generate a link to share the configured coverage map with end-users, shown in view 750. In an implementation, the link embodies the configuration options to generate an instance of the map. In other implementations, the URL references a location in data storage where the configuration information is stored. In still other implementations, the asset data service does some of both: some configuration information is encoded in the URL and other configuration information is obtained from storage.

Figure 8:
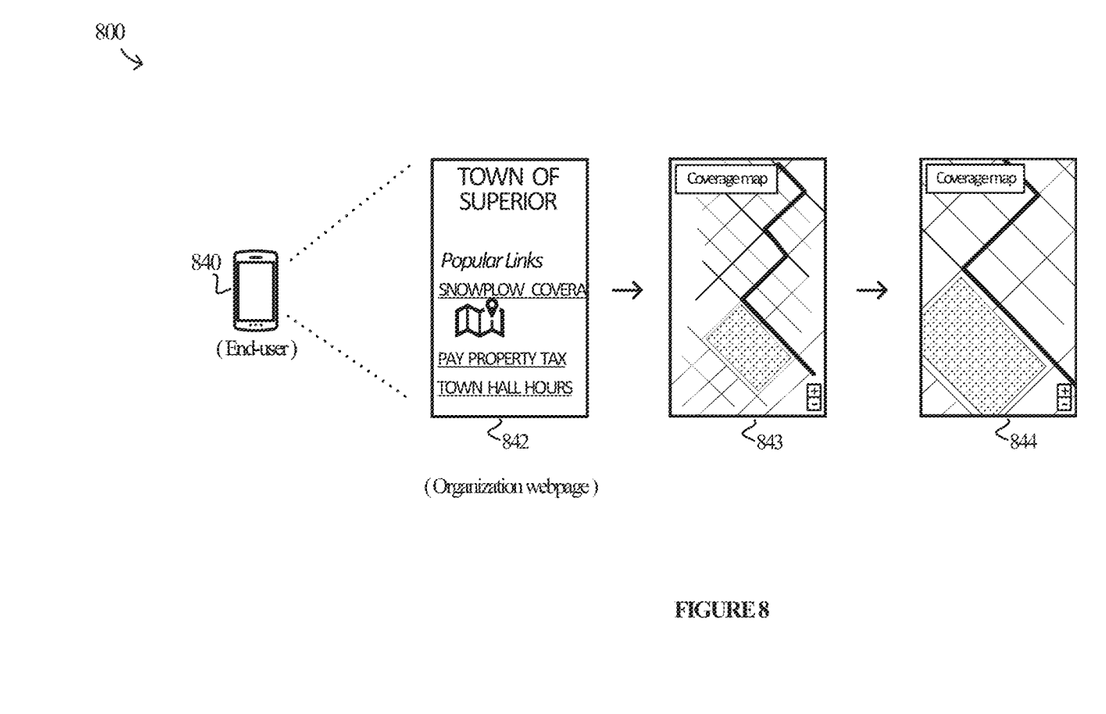
FIG. 8 illustrates a process of obtaining and viewing a coverage map in an implementation.

FIG. 8 illustrates a display on end-user device 840, where the end-user visits an organization website providing a link to a coverage map. In this example, the organization is a town which has configured a coverage map to display recent snowplow activity of its fleet of snowplows within the town. The town has configured the coverage map to display the location of a particular type of asset (the fleet of snowplows in operation) over a particular area (the area within the town limits) for a range of time (the preceding 24 hours). In view 842, when an end-user, who may be a resident of the town, clicks the map link, the asset data service transmits an instance of the configured coverage map (in view 843) illustrating the routes of the snowplows on a road map. The end-user can modify the displayed map in a few ways, such as zooming into a more detailed view (in view 844), per the display options enabled in the configuration.

FIG. 9 illustrates computing device 901 that is representative of any system or collection of systems in which the various processes, programs, services, and scenarios disclosed herein may be implemented. Examples of computing device 901 include, but are not limited to, server computers, web servers, cloud computing platforms, and data center equipment, as well as any other type of physical or virtual server machine, container, and any variation or combination thereof. Examples may also include desktop and laptop computers, tablet computers, mobile phones, mobile computers, and wearable devices.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements coverage map process 906, which is representative of the processes discussed with respect to the preceding Figures, such as processes 200 and 300. When executed by processing system 902, software 905 directs processing system 902 to operate as described herein for at least the various processes, operational scenarios, and sequences discussed in the foregoing implementations. Computing device

901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including coverage map process 906) may be implemented in program instructions and among other functions may, when executed by processing system 902, direct processing system 902 to operate as described with respect to the various operational scenarios, sequences, and processes illustrated herein. For example, software 905 may include program instructions for implementing coverage map configuration and sharing processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support asset gateway services. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, etc.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The invention claimed is:

1. A method of generating fleet coverage maps, the method comprising:
    receiving configuration information for a coverage map associated with a fleet of assets, wherein the configuration information identifies an asset type and a time range with which to limit a scope of the coverage map, wherein the time range comprises an interval of time relating to an operational history of an asset of the fleet of assets;
    encoding a uniform resource locator (URL) with the asset type and the time range;
    receiving asset data produced by an asset gateway device deployed with the asset in the fleet;
    receiving a request for the coverage map, wherein the request includes the URL;
    in response to the request, producing filtered asset data based on the asset type, the time range, and the asset data; and
    generating an instance of the coverage map based on the filtered asset data.

2. The method of claim 1, wherein the configuration information further identifies a geographic area with which to limit the scope of the coverage map and wherein producing the filtered asset data further comprises producing the filtered asset data based on the geographic area.

3. The method of claim 2, wherein generating the instance of the coverage map based on the filtered asset data comprises generating a geographic map according to the configuration information, wherein the geographic map displays a route traveled by the asset based on the filtered asset data.

4. The method of claim 3, wherein the geographic map displays one or more of a speed and a refrigeration temperature of the asset on the route.

5. The method of claim 4, wherein the route is color-coded according to recency.

6. The method of claim 1, wherein the URL is published to a website accessed by an end-user device and wherein receiving the request comprises receiving the request from the end-user device.

7. The method of claim 6, wherein producing the filtered asset data comprises filtering the asset data according to the configuration information, wherein the configuration information is received from an organization which operates the fleet of assets.

8. The method of claim 7, wherein the fleet of assets and the website are operated by an organization, wherein the organization is a different entity than the end-user.

9. A computing apparatus comprising:
    one or more computer readable storage media;
    one or more processors operatively coupled with the one or more computer readable storage media; and
    program instructions stored on the one or more computer readable storage media that, when executed by the one or more processors, direct the computing apparatus to at least:
    receive configuration information for a coverage map associated with a fleet of assets, wherein the configuration information identifies an asset type and a time range with which to limit a scope of the coverage map, wherein the time range comprises an interval of time relating to an operational history of an asset of the fleet of assets;
    encode a uniform resource locator (URL) with the asset type and the time range;
    receive asset data produced by an asset gateway device deployed with the asset in the fleet;
    receive a request for the coverage map, wherein the request includes the URL;
    in response to the request, produce filtered asset data based on the asset type, the time range, and the asset data; and
    generate an instance of the coverage map based on the filtered asset data.

10. The computing apparatus of claim 9, wherein the configuration information further identifies a geographic area with which to limit the scope of the coverage map and wherein to produce the filtered asset data, the program instructions direct the computing apparatus to produce the filtered asset data based on the geographic area.

11. The computing apparatus of claim 10, wherein to generate the instance of the coverage map based on the filtered asset data, the program instructions direct the computing apparatus to generate a geographic map according to the configuration information, wherein the geographic map displays a route traveled by the asset based on the filtered asset data.

12. The computing apparatus of claim 11, wherein the geographic map displays one or more of a speed and a refrigeration temperature of the asset on the route.

13. The computing apparatus of claim 12, wherein the route is color-coded according to recency.

14. The computing apparatus of claim 9, wherein the URL is published to a website accessed by an end-user device and wherein to receive the request, the program instructions direct the computing apparatus to receive the request from the end-user device.

15. The computing apparatus of claim 14, wherein to produce the filtered asset data, the program instructions direct the computing apparatus to filter the asset data according to the configuration information, wherein the configuration information is received from an organization which operates the fleet of assets.

16. The computing apparatus of claim 15, wherein the fleet of assets and the website are operated by an organization, wherein the organization is a different entity than the end-user.

17. One or more computer-readable storage media having program instructions stored thereon that, when executed by one or more processors of a computing device, direct the computing device to at least:
    receive configuration information for a coverage map associated with a fleet of assets, wherein the configuration information identifies an asset type and a time range with which to limit a scope of the coverage map, wherein the time range comprises an interval of time relating to an operational history of an asset of the fleet of assets;
    encode a uniform resource locator (URL) with the asset type and the time range;
    receive asset data produced by an asset gateway device deployed with the asset in the fleet;
    receive a request for the coverage map, wherein the request includes the URL;
    in response to the request, produce filtered asset data based on the asset type, the time range, and the asset data; and
    generate an instance of the coverage map based on the filtered asset data.

18. The one or more computer-readable storage media of claim 17, wherein the configuration information further identifies a geographic area with which to limit the scope of the coverage map and wherein to produce the filtered asset data, the program instructions direct the computing device to produce the filtered asset data based on the geographic area.

19. The one or more computer-readable storage media of claim 18, wherein to generate the instance of the coverage map based on the filtered asset data, the program instructions direct the computing device to generate a geographic map according to the configuration information, wherein the geographic map displays a route traveled by the asset based on the filtered asset data.

20. The one or more computer-readable storage media of claim 19, wherein the geographic map displays one or more of a speed and a refrigeration temperature of the asset on the route.

\* \* \* \* \*